United States Patent Office 2,782,193
Patented Feb. 19, 1957

2,782,193

PROCESS FOR THE PREPARATION OF 16α,17α-OXIDO-Δ⁵-PREGNENE-3β-OL-20-ONE

Carl Djerassi, Birmingham, Mich., and George Rosenkranz and John Pataki, Mexico City, Mexico, assignors to Syntex S. A., Mexico City, Mexico, a corporation of Mexico No Drawing. Application May 25, 1954,
Serial No. 432,324

1 Claim. (Cl. 260—239.55)

The present invention relates to a novel process for the production of cyclopentanophenanthrene compounds. More particularly the present invention relates to a process for the production of 16α,17α-oxido-20-ketones of the pregnane series from the corresponding 16-alkoxy 20-ketone compound.

The products produced in accordance with the present process i. e., 16α,17α-oxido-20-ketones of the pregnane series are valuable intermediates for the production of steroid hormones having a 17α-hydroxy group as for example Reichstein's substance S. Thus in an article by Julian entitled "Chemistry of The Adrenal Cortex Steroids" appearing in "Recent Progress in Hormone Research" vol. VI, 1951, page 200, there is discussed a process for the production of 16,17-epoxy-20-keto-pregnanes from the corresponding Δ¹⁶-compounds by treatment with hydrogen peroxide in alkaline medium. Further, on page 205 of the same text, a process for the production of substance S is outlined involving in part the treatment of Δ⁵,¹⁶-pregnadien-3β-ol-20-one acetate with hydrogen peroxide under alkaline conditions to form the 16α,17α-oxido derivative. Where the starting material for the Δ¹⁶-20-ketone is a corresponding steroidal sapogenin it is necessary to rearrange such a sapogenin first to the corresponding intermediate furostane compound, then to degrade to the corresponding γ-methyl-δ-acetoxy-valerate of the 16-hydroxy-20-keto-compound (diosone) and then to convert this diosone to the Δ¹⁶-20-ketone.

In accordance with the present invention the surprising discovery has been made that the intermediate diosone derivatives of the sapogenins can be treated directly with hydrogen peroxide in an alkaline medium to produce in only one step the desired steroidal 16α,17α-oxido-20-ketone.

It has further been discovered that in addition to the diosones which are substituted 16-alkoxy derivatives of steroidal 20-ketones of the pregnane series other 16-alkoxy derivatives may similarly be treated to produce 16α,17α-oxido-20-ketone of the pregnane series.

The diosone starting compounds for the present invention may be produced in accordance with the following equation wherein only ring D of the sapogenin is indicated:

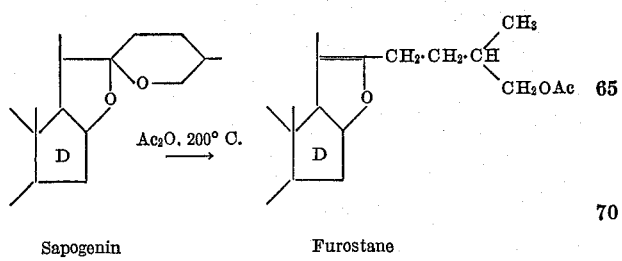

Sapogenin      Furostane

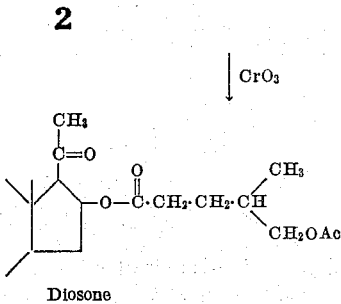

Diosone

In the above equation Ac represents the acetate radical. The above steps are well known in the art and may be generally applied to sapogenins having various substituents in rings A, B and C such as ketone or hydroxy groups at positions C–11 and/or C–12, hydroxy groups at C–3, etc. The hydroxy groups may of course be esterified initially or during the course of the reaction with acetic anhydride.

The sapogenin starting materials may also be unsaturated at various positions in rings A, B and C as between C–5 and C–6, C–7 and C–8 and elsewhere. If compounds saturated at C–5 are utilized these compounds may be of allo configuration or of normal configuration.

As examples of other 16-alkoxy derivatives there may be cited those 16-alkoxy compounds produced in accordance with the method of Fukushima and Gallagher J. A. C. S. 73, 196 (1951), i. e. the base catalyzed addition of alcohols to the 16–17 double bond.

16-alkoxy steroid derivatives may be treated in accordance with the present invention as outlined in the following equation:

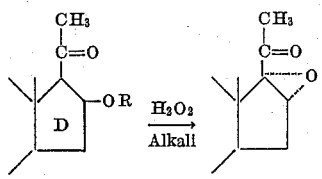

In the above equation R represents an alkyl group either substituted or unsubstituted preferably of less than 10 carbon atoms. Thus R may represent an oxygen substituted alkyl group i. e. an acyl group such as the γ-methyl-δ-acetoxy-valeryl group previously referred to. R may also represent an alkyl group such as methyl or ethyl, or an aralkyl such as the benzyl group.

In the above equation rings A, B and C (not shown) may be saturated or unsaturated and may contain various substituents as hereinbefore set forth. In practicing the process above-outlined the 16-alkoxy compound is dissolved in an organic solvent such as methanol and then mixed with aqueous solution of hydrogen peroxide and a dilute solution of a strong alkali such as an alkali metal hydroxide. The reaction mixture is then stirred for a short time and kept for a substantial period as overnight in a refrigerator kept below room temperature as for example 10° C. The resultant steroidal 16α,17α-oxido-20-ketone will then precipitate.

The following specific examples serve to illustrate but are not intended to limit the present invention:

Example I

A solution of 50 g. of the 16-(γ-methyl-δ-acetoxy)-valerate of Δ⁵-pregnen -3β,16-diol-20-one 3-acetate ("disone" of diosgenin, which may be produced therefrom by treatment with acetic anhydride and oxidation as hereinbefore set forth) in 800 cc. of methanol was mixed under stirring with 66 cc. of 30% hydrogen peroxide and 183 cc. of a 10% solution of sodium hydroxide in a period of 15 minutes and maintaining the temperature of the reaction mixture at 10° C. The solution was stirred for a further 30 minutes and then kept in the refrigerator for 20 hours. After this time, a bulky precipitate of Δ⁵-16α,17α-oxido-pregnen-3β-ol-20-one had formed. The crystals were filtered and washed with w... giving 21.8 g. with melting point 185–188° C. crop from the mother liquors yielded 5 g.

Example I...

Treatment of 50 g. valerate of pregn... diosone of 22... by the 16...

allopregnan-3β,12-diol-1... 180–185° C.